United States Patent [19]

Sato

[11] Patent Number: 5,678,058
[45] Date of Patent: Oct. 14, 1997

[54] VECTOR PROCESSOR

[75] Inventor: Taizo Sato, Kawasaki, Japan

[73] Assignee: Fujitsu Limited, Kawasaki, Japan

[21] Appl. No.: 734,312

[22] Filed: Oct. 21, 1996

Related U.S. Application Data

[63] Continuation of Ser. No. 213,505, Mar. 16, 1994, abandoned.

[30] Foreign Application Priority Data

Mar. 18, 1993 [JP] Japan ................................ 5-058506

[51] Int. Cl.$^6$ .................................................. G06F 5/00
[52] U.S. Cl. ........................ 395/800; 395/388; 395/565;
365/219; 365/239; 364/DIG. 1
[58] Field of Search ................................ 395/800, 388,
395/565; 365/230.03, 233, 219, 200, 221,
239; 364/DIG. 1

[56] References Cited

U.S. PATENT DOCUMENTS

| | | | |
|---|---|---|---|
| 4,211,997 | 7/1980 | Rudnick et al. | 371/38 |
| 4,463,421 | 7/1984 | Laws | 364/200 |
| 4,628,344 | 12/1986 | Glenn | 358/12 |
| 4,631,686 | 12/1986 | Ikawa et al. | 364/490 |
| 4,945,518 | 7/1990 | Muramatsu et al. | 365/233 |
| 4,987,559 | 1/1991 | Miyauchi et al. | 365/189.04 |
| 5,265,049 | 11/1993 | Takasugi | 365/189.01 |

*Primary Examiner*—Alyssa H. Bowler
*Assistant Examiner*—Dzung C. Nguyen
*Attorney, Agent, or Firm*—Staas & Halsey

[57] ABSTRACT

A vector processor including a vector register having a plurality of banks storing a plurality of elements of data, a plurality of vector operation units to perform a plurality of vector operations on the plurality of elements of data, a single mask register to store mask data indicating whether to mask the elements of data and controlling the vector operations performed on the elements of data by the plurality of vector operation units, a single decoder device, connected to the mask register, for generating a read address and a write address of the mask register, a serial-to-parallel converting device for receiving serial mask data from a second bus connected to the plurality of vector operation units, for converting the serial mask data into parallel mask data, and for writing the parallel mask data into the mask register at the write address generated by the decoder device, and a parallel-to-serial converting device for reading parallel mask data from the mask register at the read address generated by the decoder device, for converting the parallel mask data into serial mask data, and for outputting the serial mask data to the second bus.

5 Claims, 16 Drawing Sheets

FIG. 2
PRIOR ART

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BANK 0 | VR0 MR0 | BS0 | | | | | | | | | | | | | | |
| BANK 1 | | VR1 MR1 | BS1 | | | | | | | | | | | | | |
| BANK 2 | | | VR2 MR2 | BS2 | | | | | | | | | | | | |
| BANK 3 | | | | VR3 MR3 | BS3 | | | | | | | | | | | |
| BANK 4 | | | | | VR4 MR4 | BS4 | | | | | | | | | | |
| BANK 5 | | | | | | VR5 MR5 | BS5 | | | | | | | | | |
| BANK 6 | | | | | | | VR6 MR6 | BS6 | | | | | | | | |
| BANK 7 | | | | | | | | VR7 MR7 | BS7 | | | | | | | |
| BANK 0 | | | | | | | | | VR8 MR8 | BS8 | | | | | | |
| BANK 1 | | | | | | | | | | VR9 MR9 | BS9 | | | | | |
| BANK 2 | | | | | | | | | | | VR10 MR10 | BS10 | | | | |
| BANK 3 | | | | | | | | | | | | VR11 MR11 | BS11 | | | |
| BANK 4 | | | | | | | | | | | | | VR12 MR12 | BS12 | | |
| BANK 5 | | | | | | | | | | | | | | VR13 MR13 | BS13 | |
| BANK 6 | | | | | | | | | | | | | | | VR14 MR14 | BS14 |
| BANK 7 | | | | | | | | | | | | | | | | VR15 MR15 |

CYCLE

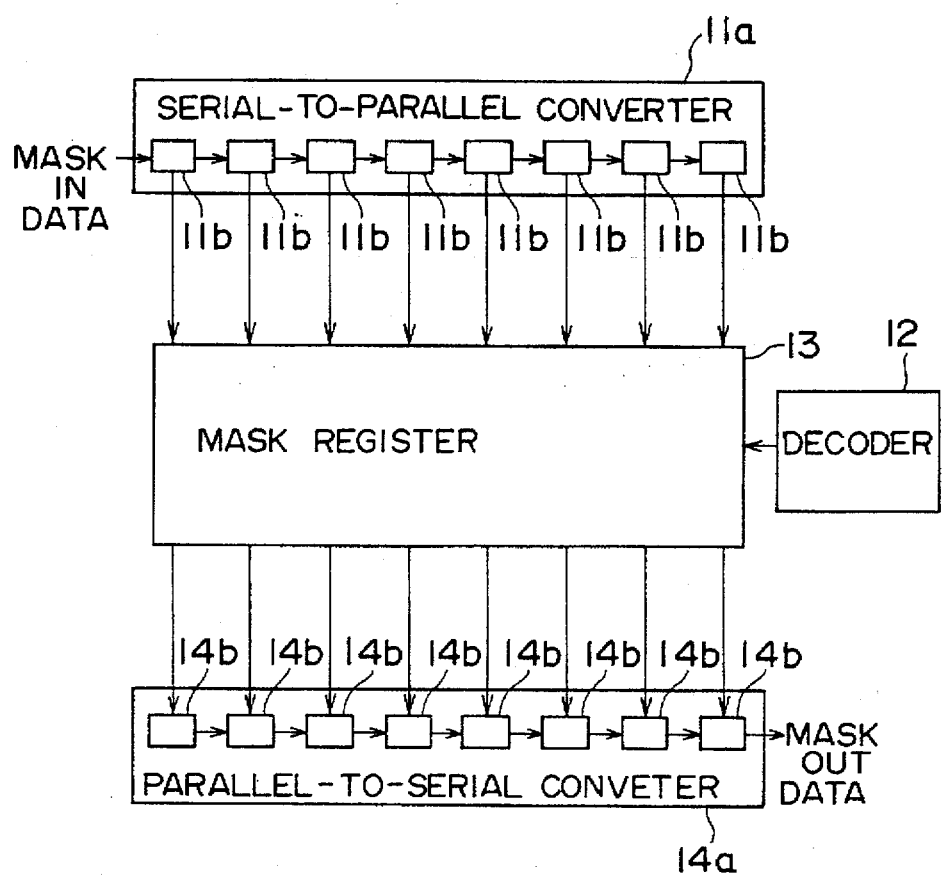

FIG. 7A

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| MASK-REG | MR 0-7 | | | | | | | | MR 8-15 | | | | | | |
| PARA-SIRI | | SO0 | SO1 | SO2 | SO3 | SO4 | SO5 | SO6 | SO7 | SO8 | SO9 | SO10 | SO11 | SO12 | SO13 |

CYCLE

FIG. 7B

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| SIRI-PARA | SI0 | SI1 | SI2 | SI3 | SI4 | SI5 | SI6 | SI7 | SI8 | SI9 | SI10 | SI11 | SI12 | SI13 | SI14 |
| MASK-REG | | | | | | | | | MR 0-7 | | | | | | |

CYCLE

FIG. 11

ADD PIPELINE

| PHASE | A | B | C | D | E | F | G | H | A | B | C | D | E | F | G | H | A |
|---|---|---|---|---|---|---|---|---|---|---|---|---|---|---|---|---|---|
| EVEN NUMBERED BANK READ | B0 | | B2 | | B4 | | B6 | | | | | | | | | | |
| ODD NUMBERED BANK READ | | B1 | | B3 | | B5 | | B7 | | | | | | | | | |
| READ BUS | | | B0 | B1 | B2 | B3 | B4 | B5 | B6 | B7 | | | | | | | |
| ADD-1 | | | | B0 | B1 | B2 | B3 | B4 | B5 | B6 | B7 | | | | | | |
| ADD-2 | | | | | B0 | B1 | B2 | B3 | B4 | B5 | B6 | B7 | | | | | |
| ADD-3 | | | | | | B0 | B1 | B2 | B3 | B4 | B5 | B6 | B7 | | | | |
| WRITE BUS | | | | | | | B0 | B1 | B2 | B3 | B4 | B5 | B6 | B7 | | | |
| EVEN NUMBERED BANK READ | | | | | | | | | | B2 | | B4 | | B6 | | | |
| ODD NUMBERED BANK READ | | | | | | | | | B1 | | B3 | | B5 | | B7 | | |

FIG. 12

MUL PIPELINE

| PHASE | C | D | E | F | G | H | A | B | C | D | E | F | G | H | A | B | C |
|---|---|---|---|---|---|---|---|---|---|---|---|---|---|---|---|---|---|
| EVEN NUMBERED BANK READ | B0 | | B2 | | B4 | | B6 | | | | | | | | | | |
| ODD NUMBERED BANK READ | | B1 | | B3 | | B5 | | B7 | | | | | | | | | |
| READ BUS | | | B0 | B1 | B2 | B3 | B4 | B5 | B6 | B7 | | | | | | | |
| MUL-1 | | | | B0 | B1 | B2 | B3 | B4 | B5 | B6 | B7 | | | | | | |
| MUL-2 | | | | | B0 | B1 | B2 | B3 | B4 | B5 | B6 | B7 | | | | | |
| MUL-3 | | | | | | B0 | B1 | B2 | B3 | B4 | B5 | B6 | B7 | | | | |
| WRITE BUS | | | | | | | B0 | B1 | B2 | B3 | B4 | B5 | B6 | B7 | | | |
| EVEN NUMBERED BANK READ | | | | | | | | | B2 | | B4 | | B6 | | | | |
| ODD NUMBERED BANK READ | | | | | | | | B1 | | B3 | | B5 | | B7 | | | |

FIG. 13

LOGIC PIPELINE

| PHASE | C | D | E | F | G | H | A | B | C | D | E | F | G | H | A | B | C |
|---|---|---|---|---|---|---|---|---|---|---|---|---|---|---|---|---|---|
| EVEN NUMBERED BANK READ | B0 |  | B2 |  | B4 |  | B6 |  |  |  |  |  |  |  |  |  |  |
| ODD NUMBERED BANK READ |  | B1 |  | B3 |  | B5 |  | B7 |  |  |  |  |  |  |  |  |  |
| READ BUS |  |  | B0 | B1 | B2 | B3 | B4 | B5 | B6 | B7 |  |  |  |  |  |  |  |
| ADD-1 |  |  |  | B0 | B1 | B2 | B3 | B4 | B5 | B6 | B7 |  |  |  |  |  |  |
| ADD-2 |  |  |  |  | B0 | B1 | B2 | B3 | B4 | B5 | B6 | B7 |  |  |  |  |  |
| ADD-3 |  |  |  |  |  | B0 | B1 | B2 | B3 | B4 | B5 | B6 | B7 |  |  |  |  |
| WRITE BUS |  |  |  |  |  |  | B0 | B1 | B2 | B3 | B4 | B5 | B6 | B7 |  |  |  |
| EVEN NUMBERED BANK READ |  |  |  |  |  |  |  | B0 |  | B2 |  | B4 |  | B6 |  |  |  |
| ODD NUMBERED BANK READ |  |  |  |  |  |  |  |  | B1 |  | B3 |  | B5 |  | B7 |  |  |

FIG. 14

MEMORY READ PIPELINE

| PHASE | G | H | A | B | C | D | E | F | G |
|---|---|---|---|---|---|---|---|---|---|
| DATA RECEIVE |  |  |  |  | B0 | B1 | B2 | B3 | B4 |
| DATA CHECK |  |  |  |  |  | B0 | B1 | B2 | B3 |
| WRITE BUS |  |  |  |  |  |  | B0 | B1 | B2 |
| EVEN BANK WRITE |  |  |  |  |  |  |  | B0 |  |
| ODD BANK WRITE |  |  |  |  |  |  |  |  | B1 |

| B5 | B6 | B7 |  |  |
|---|---|---|---|---|
| B4 | B5 | B6 | B7 |  |
| B3 | B4 | B5 | B6 | B7 |
| B2 |  | B4 |  | B6 |
|  | B3 |  | B5 |  | B7 |

FIG. 15

MEMORY WRITE PIPELINE

| PHASE | E | F | G | H | A | B | C | D | E | F | G | H | A | B | C | D | E |
|---|---|---|---|---|---|---|---|---|---|---|---|---|---|---|---|---|---|
| EVEN BANK READ | B0 |  | B1 |  | B2 |  | B3 |  | B4 |  | B5 |  | B6 |  | B7 |  |  |
| ODD BANK READ |  | B1 |  | B2 |  | B3 |  | B4 |  | B5 |  | B6 |  | B7 |  |  |  |
| READ BUS |  |  | B0 | B1 | B2 | B3 | B4 | B5 | B6 | B7 |  |  |  |  |  |  |  |
| ADDRESS CALCULATION |  |  |  | B0 | B1 | B2 | B3 | B4 | B5 | B6 | B7 |  |  |  |  |  |  |
| ADDRESS CONVERSION |  |  |  |  | B0 | B1 | B2 | B3 | B4 | B5 | B6 | B7 |  |  |  |  |  |
| ADDRESS / DATA OUTPUT |  |  |  |  |  | B0 | B1 | B2 | B3 | B4 | B5 | B6 | B7 |  |  |  |  |

FIG. 16

MASK/VECTOR REGISTERS (READ PORT)

| PHASE | A | B | C | D | E | F | G | H | A | B | C | D | E | F | G | H | A |
|---|---|---|---|---|---|---|---|---|---|---|---|---|---|---|---|---|---|
| MASK READ | ADD | ADD | MUL | MUL | LGC | LGC | STA | STA | ADD | ADD | MUL | MUL | LGC | LGC | STA | STA | ADD |
| BANK 0 READ | ADD | ADD | MUL | MUL | LGC | LGC | STA | STA | ADD | ADD | MUL | MUL | LGC | LGC | STA | STA | |
| BANK 1 READ | | ADD | ADD | MUL | MUL | LGC | LGC | STA | STA | ADD | ADD | MUL | MUL | LGC | LGC | STA | STA |
| BANK 2 READ | STA | | ADD | ADD | MUL | MUL | LGC | LGC | STA | STA | ADD | ADD | MUL | MUL | LGC | LGC | STA |
| BANK 3 READ | STA | STA | | ADD | ADD | MUL | MUL | LGC | LGC | STA | STA | ADD | ADD | MUL | MUL | LGC | LGC |
| BANK 4 READ | LGC | STA | STA | | ADD | ADD | MUL | MUL | LGC | LGC | STA | STA | ADD | ADD | MUL | MUL | LGC |
| BANK 5 READ | LGC | LGC | STA | STA | | ADD | ADD | MUL | MUL | LGC | LGC | STA | STA | ADD | ADD | MUL | MUL |
| BANK 6 READ | MUL | LGC | LGC | STA | STA | | ADD | ADD | MUL | MUL | LGC | LGC | STA | STA | ADD | ADD | MUL |
| BANK 7 READ | MUL | MUL | LGC | LGC | STA | STA | | ADD | ADD | MUL | MUL | LGC | LGC | STA | STA | ADD | ADD |

FIG. 17

MASK/VECTOR REGISTERS (WRITE PORT)

| PHASE | A | B | C | D | E | F | G | H | A | B | C | D | E | F | G | H | A |
|---|---|---|---|---|---|---|---|---|---|---|---|---|---|---|---|---|---|
| MASK READ | MUL | MUL | LGC | LGC | LDD | LDD | ADD | ADD | | | | | | | | | |
| BANK 0 READ | MUL | MUL | LGC | LGC | LDD | LDD | ADD | ADD | | | | | | | | | |
| BANK 1 READ | | MUL | MUL | LGC | LGC | LDD | LDD | ADD | ADD | | | | | | | | |
| BANK 2 READ | ADD | | MUL | MUL | LGC | LGC | LDD | LDD | ADD | | | | | | | | |
| BANK 3 READ | | ADD | | MUL | MUL | LGC | LGC | LDD | LDD | ADD | | | | | | | |
| BANK 4 READ | LDD | | ADD | | MUL | MUL | LGC | LGC | LDD | LDD | ADD | | | | | | |
| BANK 5 READ | | LDD | | ADD | | MUL | MUL | LGC | LGC | LDD | LDD | ADD | | | | | |
| BANK 6 READ | LGC | LGC | LDD | LDD | ADD | ADD | MUL | MUL | LGC | LGC | LDD | LDD | ADD | ADD | MUL | MUL | |
| BANK 7 READ | LGC | LGC | LDD | LDD | ADD | ADD | MUL | MUL | LGC | LGC | LDD | LDD | ADD | ADD | MUL | MUL | |

VECTOR PROCESSOR

This application is a continuation of application Ser. No. 08/213,505, filed Mar. 16, 1994, now abandoned.

BACKGROUND OF THE INVENTION

1. Field of the Invention

The present invention generally relates to a vector processor capable of performing high-speed operation processing, and more particularly, to improvements in a mask register that stores mask data serving as control information used to selectively perform an operation.

2. Description of the Related Art

In computation in the fields of science and technology, there are many cases where an operation is carried out for a group of data including complex data such as an arrangement, and it is required to perform such an operation at high speed.

In order to meet the above requirement, a vector processor has been used in practice. The vector processor performs pipeline processing by one instruction to thereby perform the operation at high speed, while a normal sequential processing type processor performs an operation on a group of data by means of loop processing. The vector processor performs control as to whether or not an operation should be performed by referring to mask data stored in a mask register, rather than referring to a condition for branching. Hence, the performance of the vector processor is not degraded much at the time of branch processing.

Recently, processors have been required to have higher performance and more compact sizes. The vector processor which is one of such processors has been particularly required to reduce the chip area with an advance in the performance thereof.

SUMMARY OF THE INVENTION

It is an object of the present invention to provide a vector processor which meets the above requirements.

This object of the present invention is achieved by a vector processor comprising:

a vector register comprising a plurality of banks;

a plurality of vector operation units coupled to the vector register via a first bus;

a mask register for storing mask data which are related to elements of data and controls vector operations performed by the vector operation units;

decoder means for generating read and write addresses of the mask register;

serial-to-parallel converting means for converting serial mask data into parallel mask data written into the mask register according to the write address generated by the decoder means; and parallel-to-serial converting means for converting the parallel mask data read from the mask register according to the read address into serial mask data output to a second bus to which the vector operation units are connected.

BRIEF DESCRIPTION OF THE DRAWINGS

Other objects, features and advantages of the present invention will become more apparent from the following detailed description when read in conjunction with the accompanying drawings, in which:

FIG. 2 (PRIOR ART) is a timing chart of the operation of the vector processor;

FIG. 5 is a block diagram of peripheral circuits of a mask register shown in FIG. 4;

FIG. 6 is a diagram showing a data structure of the mask register shown in FIGS. 4 and 5;

FIG. 7A is a timing chart of the read operation on the mask register shown in FIG. 4;

FIG. 7B is a timing chart of the write operation on the mask register shown in FIG. 4;

FIG. 11 is a timing chart of the operation of an ADD (addition) pipeline;

FIG. 12 is a timing chart of the operation of a MUL (multiplication) pipeline;

FIG. 13 is a timing chart of the operation of a LOGIC (logic operation) pipeline;

FIG. 14 is a timing chart of a memory read pipeline;

FIG. 15 is a timing chart of a memory write pipeline;

FIG. 16 is a timing chart showing the relationships between the read operations of the mask register and the vector register and operation phases; and FIG. 17 is a timing chart showing the relationships between the write operations of the mask register and the vector register and operation phases.

DESCRIPTION OF THE PREFERRED EMBODIMENT

A description will now be given, with reference to FIG. 1, of a vector processor related to the present invention.

Figure 1:
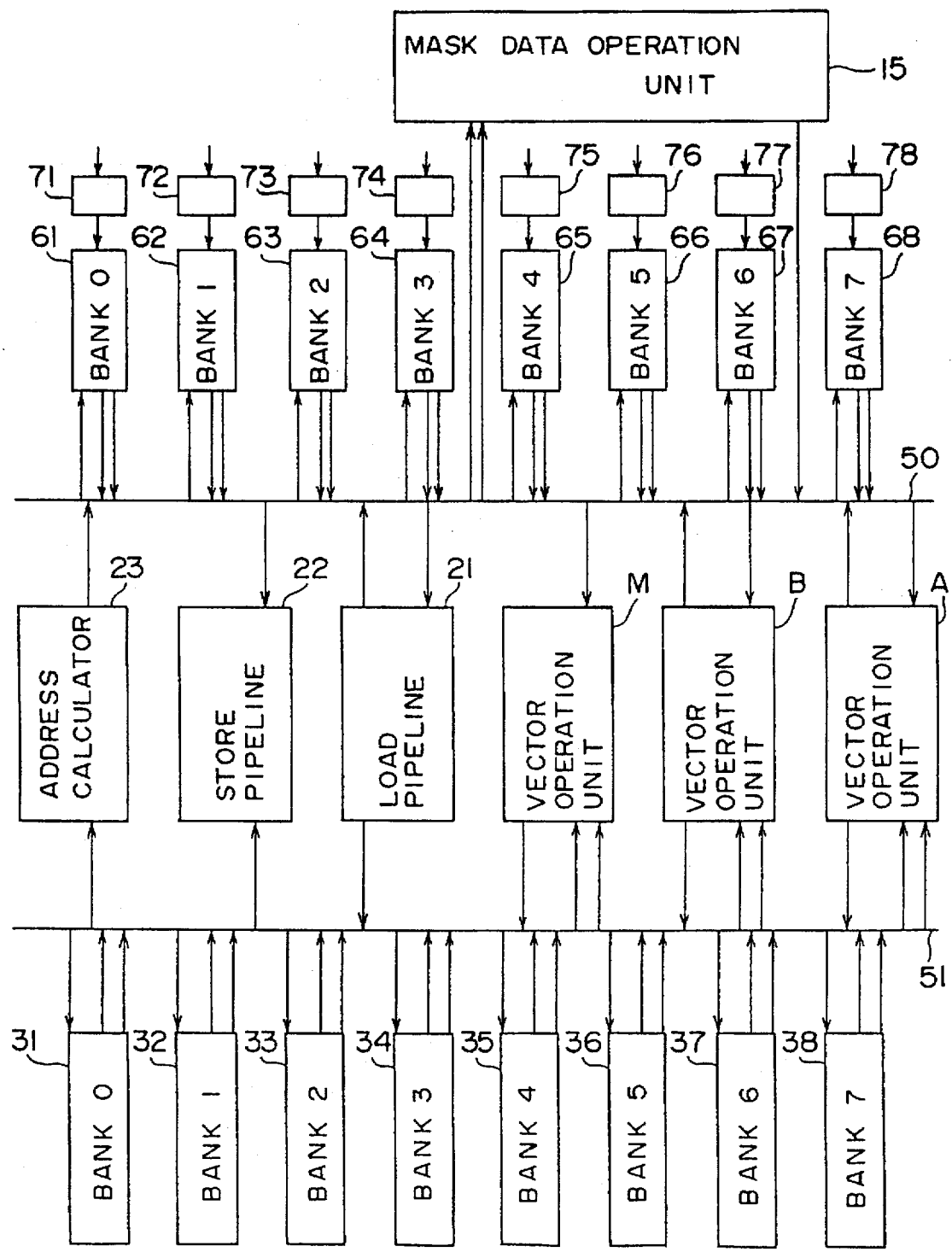
FIG. 1 (PRIOR ART) is a vector processor related to the present invention.

The vector processor shown in FIG. 1 includes a first vector operation unit A, a second vector operation unit B, a third vector operation unit M, a load pipeline 21, a store pipeline 22 and an address calculator 23. These parts are connected between buses 50 and 51. A vector register is divided into a plurality of banks (eight banks 0–7 in FIG. 1) 31 through 38, which are connected to the bus 51. A mask register is also divided into a plurality of banks (eight banks 0–7 in FIG. 1) 61 through 68, which are connected to the bus 50. The number of vector register banks 31–38 is the same as that of mask register banks 61–68. The vector register banks 31–38 are associated with and cooperate with the mask register banks 31–38, respectively. A plurality of decoders (eight decoders in FIG. 1) 71 through 78 are connected to the mask register banks 61 through 68, respectively. A mask data operation unit 15 is connected to the bus 50.

The vector register banks 31 through 38 are operated by an interleaving process in which data can be concurrently written into or read from some of the vector register banks for each operation cycle.

The mask register banks 61 through 68 respectively store control data (mask data) which causes an operation to be selectively performed. That is, the mask register banks 61 through 68 store mask data on elements to be operated., in which the mask data indicates whether or not an operation using the corresponding vector register bank should be carried out. The decoders 71 through 78 receive respective address data. The mask data operation unit 15 reads mask data from one of the mask register banks 61 through 68 and performs a predetermined operation on the read mask data. The result of the operation is written into one of the mask register banks 61 through 68.

FIG. 2 is a timing chart of the operation of the vector processor shown in FIG. 1. In FIG. 2, symbols VR0–VR15 denote vector registers or vector register numbers, symbols MR0–MR15 denote mask registers or mask register numbers, and symbols BS0–BS15 denote timings at which information read from the relevant vector register bank and the relevant mask register bank is transferred to the relevant processor (one of the vector operation units A, B and M).

The mask data indicates whether or not elements to be operated should be masked. For example, the mask data MR0 indicates whether or not elements E0 and E8 to be operated should be masked. The mask data is one-bit data for each of the elements.

Figure 3:
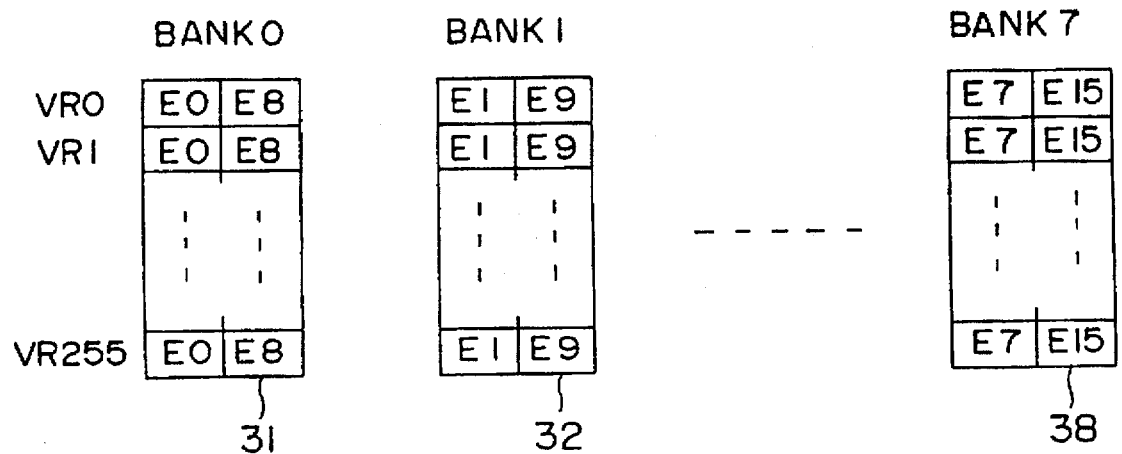
FIG. 3 (PRIOR ART) is a diagram showing a data structure of a vector register having a plurality of banks shown in FIG. 1.

FIG. 3 shows the contents of the vector register banks 31–38. Each of the vector register banks 31–38 includes vector registers VR0–VR255. The bank 31 (bank 0) stores elements E0 and E8 for each of the vector registers VR0–VR255. The bank 32 (bank 1) stores elements E1 and E9 for each of the vector registers VR0–VR255. The other vector register banks 33–38 are configured in the same manner as described above.

The operation of the vector processor shown in FIG. 1 will be described below. In cycle 0, the decoder 71 (FIG. 1) decodes the relevant address data and causes the mask register bank 61 (bank 0) to output the mask data stored in the mask register MR0 specified by the above address data. At the same time, the relevant vector register VR0 formed in the vector register bank 31 (bank 0) is accessed by a corresponding decoder (not shown), and the elements stored therein are read and output to the bus 51. In the example shown in FIG. 3, in cycle 0, the one-bit mask data on the element E0 and the one-bit mask data on the element E8 are read from the mask register bank 61, and the elements E0 and E8 are read from the vector register bank 31. In cycle 1, the elements E0 and E8 are output to the bus 51, while the mask data on the elements E0 and E8 is output to the bus 50. If the mask data indicates that the elements E0 and E8 should be masked, an operation on the elements E0 and E8 is not carried out.

In cycle 1, the mask data and the elements E0 and E8 are output to the bus 51, and the decoder 72 (FIG. 1) decodes the relevant address data and causes the mask register bank 62 to output the mask data stored in the mask register MR1 specified by the above address data. At the same time, the relevant vector register VR1 formed in the vector register bank 32 (bank 0) is accessed by means of a corresponding decoder (not shown), and the elements stored therein are read and output to the bus 51. In the example shown in FIG. 3, in cycle 1, the one-bit mask data on the element E0 and the one-bit mask data on the element E8 are read from the mask register bank 62, and the elements E0 and E8 are read from the vector register bank 32. In cycle 2, the elements E0 and E8 read in cycle 1 are output to the bus 51, while the mask data on the elements E0 and E8 read in cycle 1 is output to the bus 50.

In the above-mentioned manner, the mask register banks 61–68 are serially accessed and the mask data is read.

The prior art configuration shown in FIG. 1 is not, however, suitable for a one-chip vector processor. Normally, the chip size of a one-chip vector processor is limited. The configuration shown in FIG. 1 uses eight decoders 71–78, each of which is required to decode the address corresponding signal and one of the 256 mask register numbers. The eight decoders 71–78 occupy a large area on the chip, and hence the chip area cannot be efficiently used.

Figure 4:
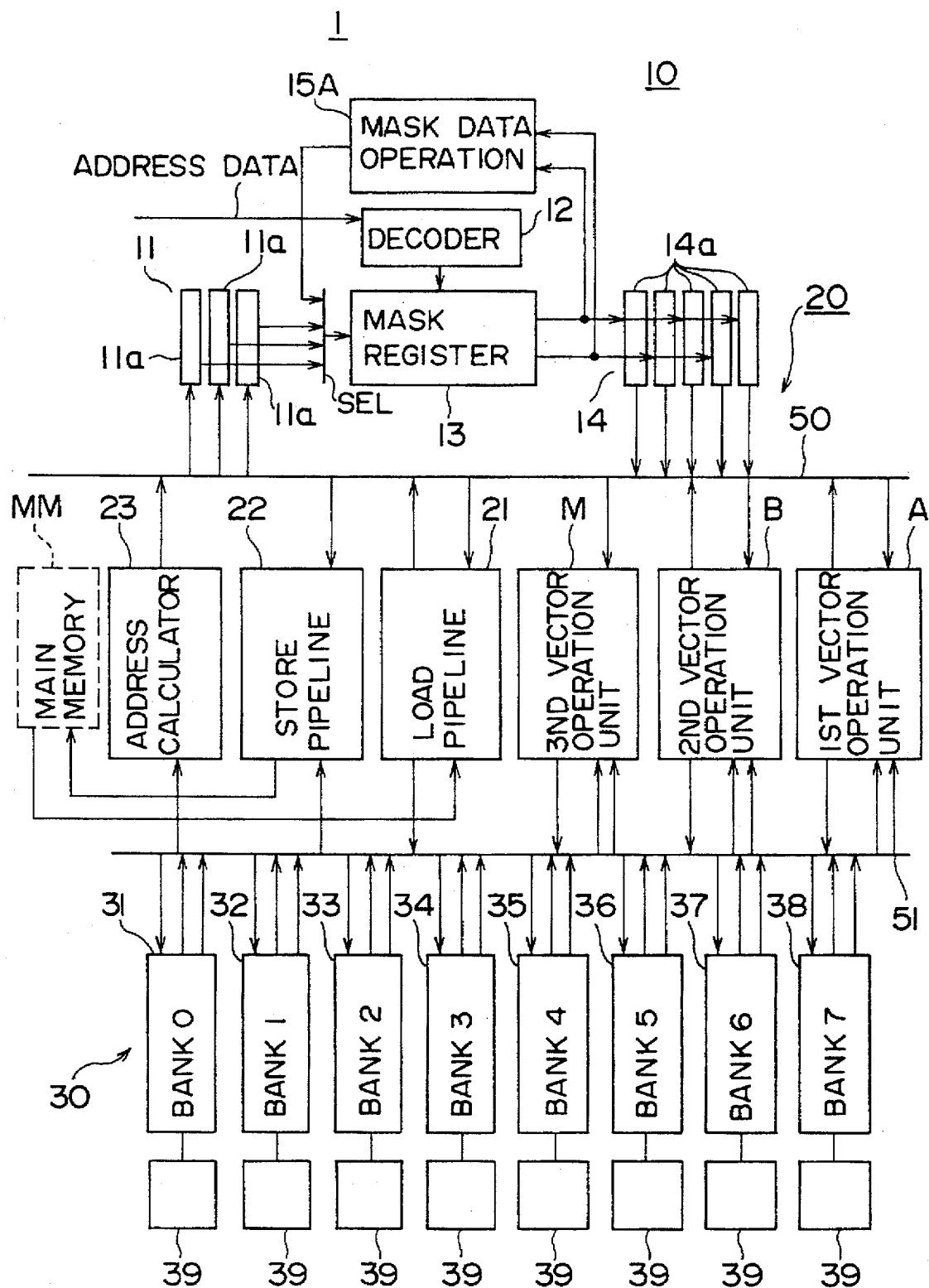
FIG. 4 is a block diagram of a vector processor according to an embodiment of the present invention.

FIG. 4 is a block diagram of a vector processor 1 according to an embodiment of the present invention. In FIG. 4, parts that are the same as those shown in FIG. 1 are given the same reference numbers. The vector processor 1 shown in FIG. 4 is made up of a mask processing unit 10, an operation unit 20 and a vector register unit 30.

The mask processing unit 10 includes a serial-to-parallel converter 11, a decoder 12, a single mask register 13, a parallel-to-serial converter 14 and a mask operation unit 15A. These parts of the mask processing unit 10 are used instead of the mask register banks 61–68, the associated decoders 71–78 and the mask operation unit 15 shown in FIG. 1.

The operation processing unit 20 includes the first vector operation unit A, the second vector operation unit B, the third vector operation unit M, the load pipeline unit 21, the store pipeline unit 22, and the address calculator 23. The vector register unit 30 includes the vector register banks 31–38 and decoders 39 respectively connected to the banks 31–38. The bus 50 connects the mask processing unit 10 and the operation processing unit 20 together. The bus 51 connects the operation processing unit 20 and the vector register unit 30. A symbol MM denotes a main memory connected to the vector processor 1, more particularly, the load pipeline unit 21 and the store pipeline unit 22.

The vector processor 1 shown in FIG. 4 includes eight vector register banks 31–38 (bank 0–bank 7), and is capable of concurrently performing four-port writing/eight-port reading in one cycle.

More particularly, the serial-to-parallel converter 11 converts mask data transferred, in serial form, from any of the vector operation units A, B and M or the main memory MM into parallel mask data. For example, the converter 11 converts eight-bit serial mask data into eight-bit parallel mask data. The converter 11 includes a plurality of eight-bit serial-to-parallel converter circuits 11a (for example, three circuits) connected between the bus 50 and the mask register 13. It is preferable to provide a selector SEL between the converter 11 and the mask register 13. The selector SEL is controlled on a time-division base. The selector SEL also receives the mask data output by the mask operation unit 15.

The decoder 12 receives address data externally transferred and generates, therefrom, a read address of the mask register 13 and a write address thereof. The parallel mask data from the serial-to-parallel converter 11 is written into an area of the mask register 13 specified by the write address. Serial mask data stored in an area specified by the read address is read therefrom, and output the parallel-to-serial converter 14. Simultaneously, serial mask data via one read port of the mask register 13 and serial mask data via the other read port thereof are output to the converter 14. The converter 14 converts the serial mask data transferred from the mask register 13 into parallel mask data, which is output to the bus 50. The converter 14 includes a plurality of parallel-to-serial converter circuits 14a (for example, five circuits).

FIG. 5 shows one of the serial-to-parallel converter circuit 11a, the decoder 12, the mask register 13, and one of the parallel-to-serial converter circuit 14a. The serial-to-parallel converter circuit 11a, which receives eight-bit serial mask data, is made up of a plurality of (eight in the configuration shown in FIG. 5) conversion units 11b, each including a latch circuit and logic gates such as AND gates for controlling output timing. The circuit 11a outputs eight-bit parallel mask data. The parallel-to-serial converter circuit 14a, which receives eight-bit parallel mask data, includes a plurality of (eight in the configuration shown in FIG. 5) conversion units 14b, each including a D-type flip-flop and selectors. The circuit 14a serially outputs eight-bit serial mask data.

It is possible to read mask data via two ports and write mask data via one port every two cycles. When eight-bit mask data is handled as one unit, it is possible to realize four-port writing/eight port reading in each cycle as a whole of the mask register 13.

FIG. 6 shows mask data stored in the mask register 13. The mask register 13 has storage areas specified by mask register numbers MR0–MR255 specified by vector instructions. The storage areas related to the respective mask register numbers MR0–MR255 each have element numbers E0–E15 specifying the relevant elements of data to be operated.

The mask operation circuit 15A shown in FIG. 4 receives two parallel mask data from the mask register 13 in each cycle in order to perform a two-input/one-output operation. Further, the mask operation circuit 15A outputs a one-bit operation result to the selector SEL shown in FIG. 4.

The operation processing unit 20 controls mask control of vector data read from the vector register unit 30 on the basis of the serial mask data. The first and second vector operation units A and B perform vector operations (+, −, ×, ÷, etc.) including the comparing operation. The vector processor M performs vector operations which do not include the comparing operation. The load pipeline unit 21 receives vector data output from the main memory MM, and outputs the receives vector data to the vector register unit 30 via the bus 51. The store pipeline unit 22 receives vector data from the vector register unit 30 via the bus 51, and outputs the received vector data the main memory MM. The address calculator 23 calculates read and write addresses of the main memory MM.

Each of the first and second vector operation units A and B is an operation unit which performs an operation on two inputs and generates one output according to a pipeline process and which can process one operation in four cycles. When a four-stage pipeline structure is employed, an operation result can be obtained in each cycle. The mask control can be performed on the basis of not only the serial mask data read from the mask register 13 but also serial mask data generated from a comparing operation. With the above in mind, the first vector operation unit A can receive two data from the vector register unit 30 in each cycle and can outputs one datum of the result of an operation on the received two data in each cycle. Further, the first vector operation unit A can receive one bit of the serial mask data from the mask processing unit 10 in each cycle, and can output one-bit mask data corresponding to an operation result in each cycle to the mask processing unit 10. The above mask control is carried out via paths connected between the vector unit A and the bus 50 and between the vector unit A and the buses 51.

The third vector operation unit M has almost the same structure as the first vector operation unit A. However, a small number of paths connected to the bus 50 is used, as compared with the first vector operation unit A. The load pipeline unit 21 includes a path for reading vector data and the mask data from the main memory MM and outputting the read data to the vector register unit 30 and the mask processing unit 10 via the buses 51 and 50, a path for supplying one vector data to the vector register unit 30 in each cycle, a path for receiving one-bit serial mask data from the mask processing unit 10, and a path for outputting one-bit mask data to the mask processing unit 10. The store pipeline 22 includes a path receiving a single datum from the vector register unit 30 and one-bit serial mask data from the mask processing unit 10 in each cycle in order to supply vector data from the vector register unit 30 and the serial mask data read from the mask processing unit 10. The address calculator 23 includes a path receiving one vector datum from the vector register unit 30 in order to perform an address calculation using vector data read from the vector register unit 30 or scalor data supplied as an instruction.

The vector register unit 30 temporarily stores vector data, and includes eight banks 31–38 (bank 0–7), as shown in FIG. 3. The element numbers assigned to elements of data are specified by the decoders 39 respectively provided for the vector register banks 31–38. In each of the vector register banks 31–38, it is possible to read data via two ports and write data via one port every two cycles. When two banks are paired to perform an interleave operation, it is possible to realize four-port writing/eight-port reading in each cycle as a whole of the vector register unit 30.

It can be seen from the above that the vector register unit 30 needs eight read paths and four write paths and the mask processing unit 10 needs seven read paths and four write paths. Each of the register banks 31–38 and the mask register 13 is capable of concurrently performing the read operation on eight ports and the write operation on four ports in each cycle. Hence, the above-mentioned operation units can operate simultaneously.

A description will now be given, with reference to FIGS. 7A and 7B, of the operation of the vector processor 1 according to the embodiment of the present invention.

FIG. 7A is a timing chart of the read operation of the mask processing unit 10. In FIG. 7A, MR0–MR15 denote the mask register numbers, and symbols SO0–SO14 denote timings at which the serial mask data is output to the bus 50 (FIG. 4). In cycle 0, the eight-bit parallel mask data related to the mask registers MR0–MR7 are read from the mask register 13 (FIG. 4). The parallel-to-serial converter 14 converts the eight-bit parallel mask data into eight-bit serial mask data. In cycles 1–8, the one-bit mask data related to the banks 0–7 is serially output to the bus 50, respectively. In cycle 8, the eight-bit parallel mask data related to the mask registers MR8–MR15 are read from the mask register 13. The parallel-to-serial converter 14 converts the above eight-bit parallel mask data into eight-bit serial mask data. In cycles 8–16 (cycle 16 is not shown in FIG. 7A), the one-bit mask data related to the banks 8–15 is serially output to the bus 50, respectively. The five converter circuits 14a can be simultaneously operated.

FIG. 7B is a timing chart of the write operation of the mask processing unit 10. Symbols SI0–SI15 denote timings at which one-bit serial mask data is input to the serial-to-parallel converter 11 from the bus 50. In cycles 0–7 (timings SI0–SI7), one-bit mask data is input to the converter 11. In cycle 8, the eight-bit parallel mask data output by the converter 11 is written into the mask register 13. The tree converter circuits 11a can be simultaneously operated.

Figure 8:
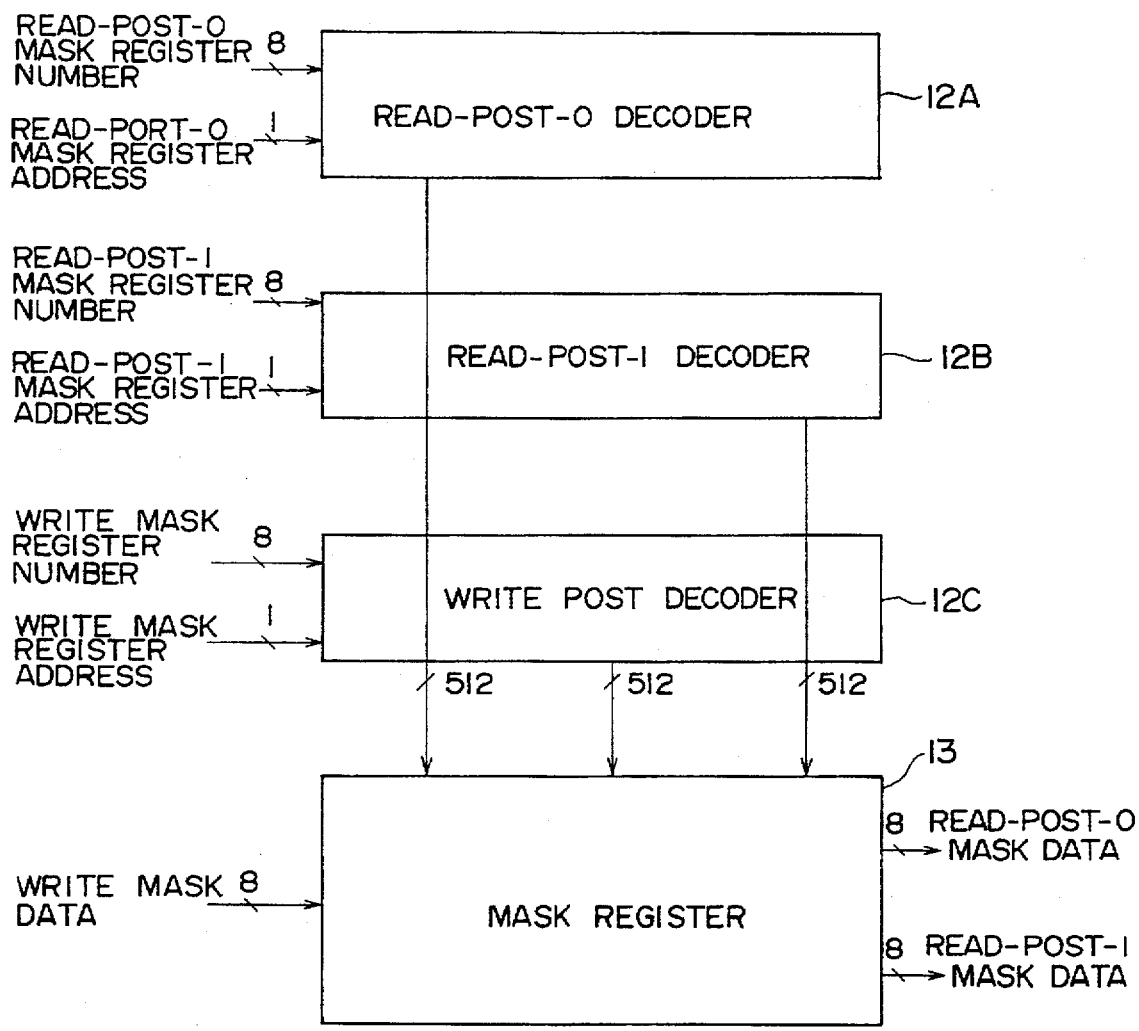
FIG. 8 is a block diagram of a decoder shown in FIG. 4.

FIG. 8 is a block diagram of the decoder 12 shown in FIG. 4. As shown in FIG. 8, the decoder 12 is made up of a read-port-0 decoder 12A, a read-port-1 decoder 12B and a write-port decoder 12C. The decoder 12A receives an eight-bit read-port-0 mask register number and a one-bit read-port-0 mask register address, and outputs 512-bit read-port-0 decoded signals to the mask register 13. The decoder 12B receives an eight-bit read-port-1 mask register number and a one-bit read-port-1 mask register address, and outputs 512-bit read-port-1 decoded signals to the mask register 13. The write-port decoder 12C receives an eight-bit write mask register number and a one-bit register address, and outputs 512-bit decoded signals to the mask register 13.

Figure 9A:
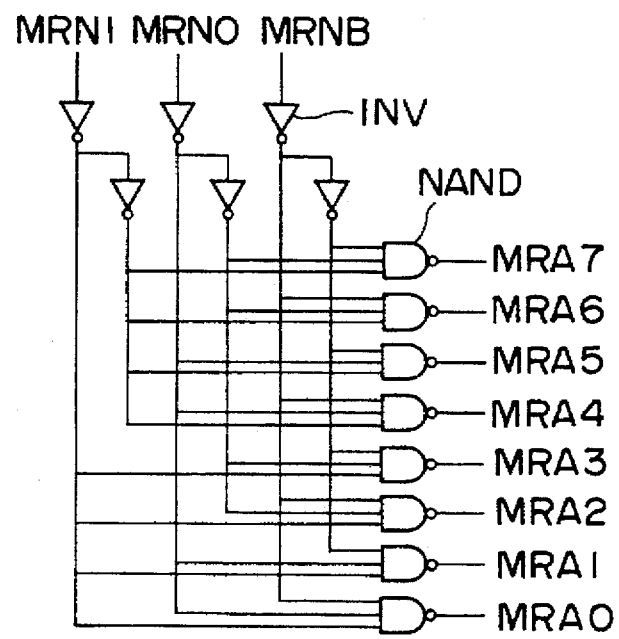
FIGS. 9A, 9B, 9C and 9D are circuit diagrams of the decoder shown in FIGS. 4 and 8.
Figure 9B:
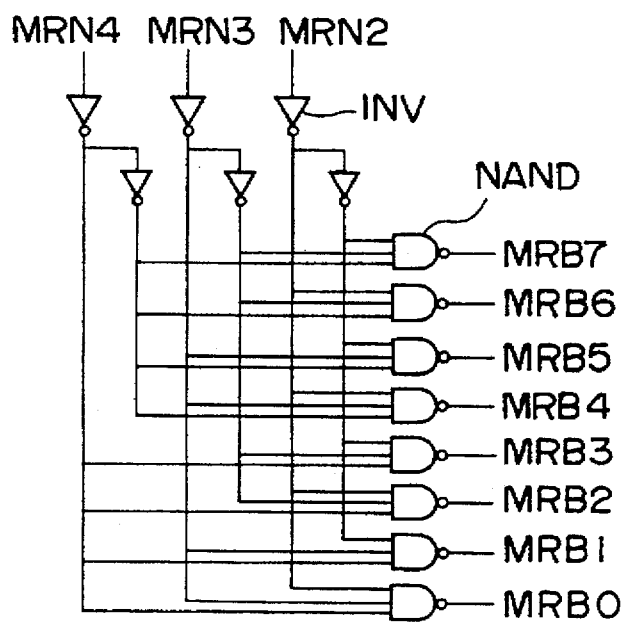
Figure 9C:
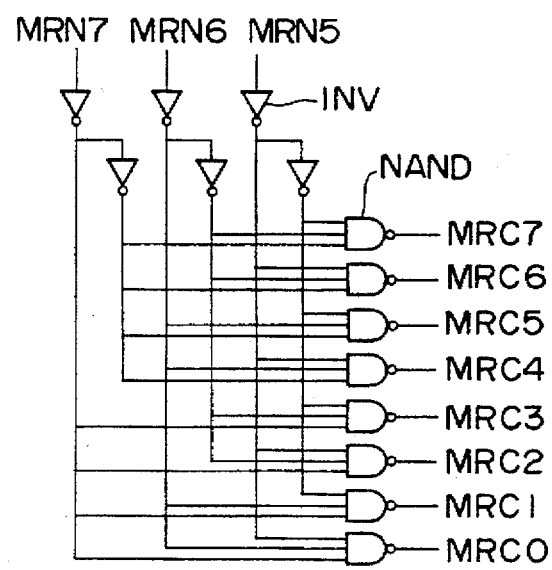
Figure 9D:
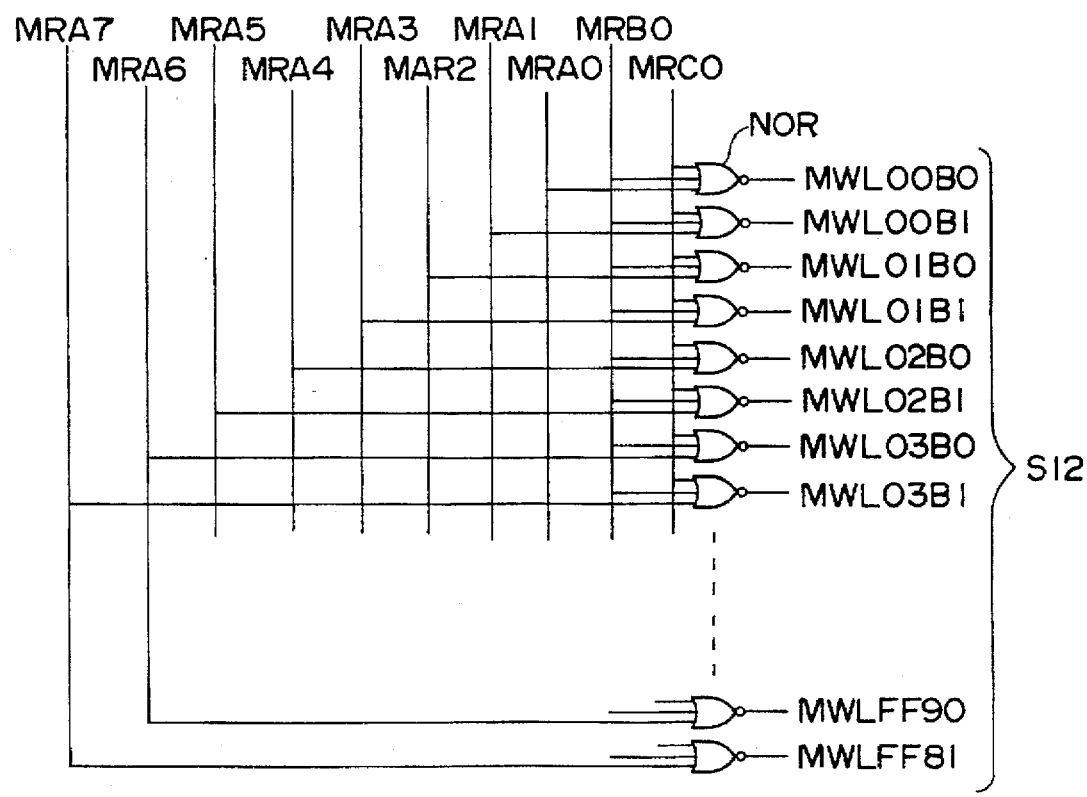

FIGS. 9A, 9B, 9C and 9D are circuit diagram of the read-port-0 decoder 12A. The other decoders 12B and 12C each have the same circuit configuration as shown in FIGS. 9A through 9D. The circuits shown in FIGS. 9A, 9B and 9C form a first stage of the decoder 12A, and FIG. 9D form a second stage thereof. The circuit shown in FIG. 9D is a part of the second-stage circuit. The circuit shown in FIG. 9A includes six inverters INV and eight NAND gates NAND. The circuit shown in FIG. 9A receives read-port-0 mask register numbers MRN0 and MRN1 and the read-0-mask register address MRNB, and outputs decoded signals MRA0 through MRA7. Each of the circuits shown in FIGS. 9B and 9C has the same configuration as that shown in FIG. 9A. The circuit shown in FIG. 9B receives read-port-0 mask register numbers MRN2, MRN3 and MRN4, and outputs decoded signals MRB0–MRB7. The circuit shown in FIG. 9C receives read-port-0 mask register numbers MRN5, MRN6 and MRN7, and outputs decoded signals MRC0–MRC7.

The circuit shown in FIG. 9D includes 512 NOR gates NOR. The circuit receives the decoded signals from the circuits shown in FIGS. 9A through 9C, and outputs 512 decoded signals MWL00B0 through MWLFFB1.

Figure 10:
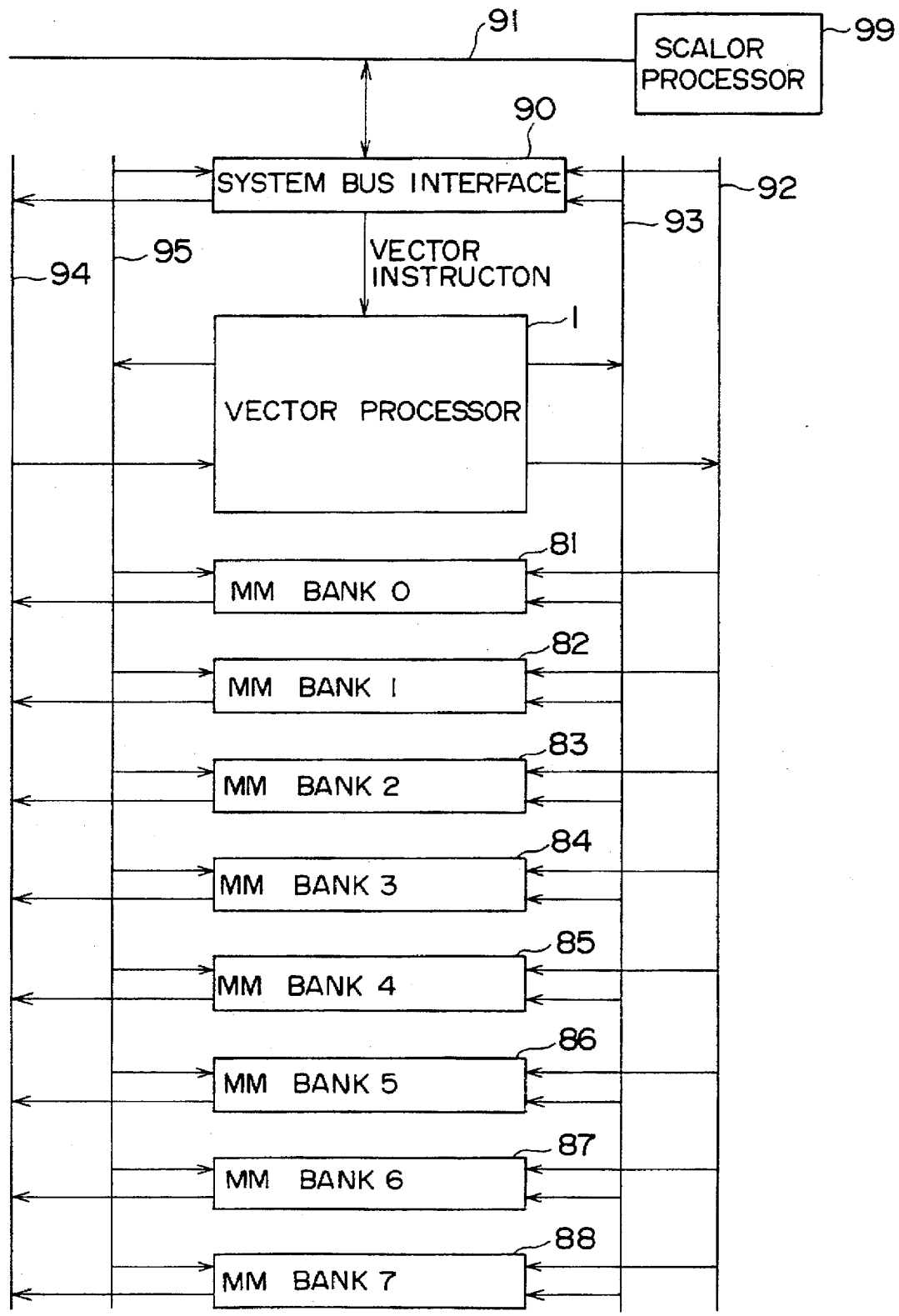
FIG. 10 is a block diagram of a vector processor system having the vector processor shown in FIG. 4.

FIG. 10 shows the internal structure of the main memory MM and the connection between the vector processor 1 and the main memory MM. The vector processor 1 and the main memory MM form a vector processor system. As has been described previously, the vector processor 1 processes vector data composed of a plurality of elements. The main memory MM is divided into a plurality of banks which are interleaved in order to make it possible to read and write data every cycle. In the configuration shown in FIG. 10, the main memory is divided into eight banks 81 through 88 (bank 0 through bank 7), which are connected to a read address bus 92, a write address bus 93, a read data bus 94 and a write data bus 95. In practice, the main memory MM is formed with a RAM, which operates at a speed lower than that of the vector processing units. Hence, it is preferable to divide the main memory MM into a large number (for example, 256) of banks. The vector processor 1 is connected to the read address bus 92, the write address bus 93, the read data bus 94 and the write data bus 95. A system bus interface 90 establishes an interface between a system bus 91 and each of the buses 92–95. A scalor processor 99 is connected to the system bus. The vector processor 1 communicates with the scalor processor 99 via the system bus interface 90. The vector processor 1 receives a scalor instruction from the scalor processor 99 via the system bus interface 90, and performs the vector operation. Further, the system bus interface 90 interfaces an auxiliary storage device such as a disk storage drive and terminal equipment. Further, an interface (not shown) for establishing an interface with an external device is provided in the same manner as that of the conventional vector processor system.

FIG. 11 is a timing chart of an ADD (addition) pipeline which forms an addition operation. The ADD pipeline consists of seven stages, that is, a register read, a read bus transfer, a first ADD operation (ADD-1), a second ADD operation (ADD-2), a third ADD operation (ADD-3), a write bus transfer and a register write. The stages of the bank read and the bank write are processed in two cycles. Hence, the even-numbered banks and the odd-numbered banks are interleaved. Symbol B0 denotes the pipeline stage which processes the elements stored in bank 0. In phases (cycles) A and B, the read operation on the vector register bank 0 (indicated by the reference number 31 in FIG. 4) is performed. In phase C, the elements read in the phases A and B are transferred to the relevant vector operation unit via the bus 51. In phase D, the first ADD operation ADD-1 on the elements read from bank 0 is performed. In phase E, the second ADD operation ADD-2 is performed, and in phase F, the third ADD operation ADD-3 is performed. In phase G, the operation result is transferred to the vector register bank 0 via the bus 51. In phases G and H, the operation result is written into the vector register bank 0 (31). In FIG. 11, symbols B1–B7 respectively show how the elements stored in the vector register banks 1 (32)–7 (38) are processed in the pipeline stages. In the above-mentioned manner, data processing is performed in which one element is processed in one cycle.

FIG. 12 is a timing chart of a MUL (multiplication) pipeline which forms a multiplying operation. The MUL pipeline consists of seven stages, that is, a register read, a read bus transfer, a first MUL operation (MUL-1), a second MUL operation (MUL-2), a third MUL operation (MUL-3), a write bus transfer and a register write. The stages of the bank read and the bank write are processed in two cycles. Hence, the even-numbered banks and the odd-numbered banks are interleaved. Symbol B0 denotes the pipeline stage which processes the elements stored in bank 0. In phases (cycles) A and B, the read operation on the vector register bank 0 (indicated by the reference number 31 in FIG. 4) is performed. In phase C, the elements read in the phases A and B are transferred to the relevant vector operation unit via the bus 51. In phase D, the first MUL operation MUL-1 on the elements read from bank 0 is performed. In phase E, the second MUL operation MUL-2 is performed, and in phase F, the third MUL operation MUL-3 is performed. In phase G, the operation result is transferred to the vector register bank 0 via the bus 51. In phases G and H, the operation result is written into the vector register bank 0 (31). In FIG. 11, symbols B1–B7 respectively show how the elements stored in the vector register banks 1 (32)–7 (38) are processed in the pipeline stages. In the above-mentioned manner, data processing is performed in which one element is processed in one cycle.

FIG. 13 is a timing chart of a LOGIC (logic operation) pipeline which forms a logic operation. The LOGIC pipeline consists of seven stages, that is, a register read, a read bus transfer, a first LOGIC operation (LOGIC-1), a second LOGIC operation (LOGIC-2), a third LOGIC operation (LOGIC-3), a write bus transfer and a register write. The stages of the bank read and the bank write are processed in two cycles. Hence, the even-numbered banks and the odd-numbered banks are interleaved. Symbol B0 denotes the pipeline stage which processes the elements stored in bank 0. In phases (cycles) A and B, the read operation on the vector register bank 0 (indicated by the reference number 31 in FIG. 4) is performed. In phase C, the elements read in the phases A and B are transferred to the relevant vector operation unit via the bus 51. In phase D, the first LOGIC operation LOGIC-1 on the elements read from bank 0 is performed. In phase E, the second LOGIC operation LOGIC-2 is performed, and in phase F, the third LOGIC operation LOGIC-3 is performed. In phase G, the operation result is transferred to the vector register bank 0 via the bus 51. In phases G and H, the operation result is written into the vector register bank 0 (31). In FIG. 11, symbols B1–B7 respectively show how the elements stored in the vector register banks 1 (32)–7 (38) are processed in the pipeline stages. In the above-mentioned manner, data processing is performed in which one element is processed in one cycle.

As shown in FIGS. 11 through 13, by interleaving the phases in which the vector operation units and the register banks, it becomes possible to simultaneously operate the three vector operation units and simultaneously process data of three operations.

FIG. 14 is a timing chart of a memory read pipeline, in which data read from the main memory MM is written into the vector register 30 by utilizing phases which are not used by the three vector operation units A, B and M.

FIG. 15 is a timing chart of a memory write pipeline, in which data to be written into the main memory MM is read from the vector register 30 by utilizing phases which are not used by the three vector operation units A, B and M.

FIG. 16 is a timing chart showing the relationships between the read operations of the mask register 13 and the vector register 30 and the phases. In FIG. 16, symbol ADD shows a phase used for the ADD pipeline, and symbol MUL shows a phase used for the MUL pipeline. Further, symbol LGC shows a phase used for the LOGIC pipeline, and symbol STA shows a phase used for the write pipeline shown in FIG. 15.

FIG. 17 is a timing chart showing the relationships between the write operations of the mask register 13 and the vector register 30 and the phases. In FIG. 17, symbol ADD shows a phase used for the ADD pipeline, and symbol MUL shows a phase used for the MUL pipeline. Further, symbol LGC shows a phase used for the LOGIC pipeline, and symbol LDD shows a phase used for the read pipeline shown in FIG. 15.

The aforementioned configuration of the present invention is suitable for forming a one-chip vector processor.

The present invention is not limited to the specifically disclosed embodiments, and variations and modifications may be made without departing from the scope of the present invention.

What is claimed is:

1. A vector processor comprising:

a vector register including a plurality of banks storing a plurality of elements of data;

a plurality of vector operation units connected to the vector register via a first bus, to perform a plurality of vector operations on said plurality of elements of data;

only one mask register to store mask data indicating whether to mask said elements of data and controlling said plurality of vector operations performed on said elements of data by the plurality of vector operation units;

only one decoder device, connected to the mask register, for generating a read address and a write address of the mask register;

serial-to-parallel converting means, connected to the only one mask register and connected to the plurality of vector operation units via a second bus, for receiving serial mask data from the second bus, for converting the serial mask data into parallel mask data, and for writing the parallel mask data into the mask register at the write address generated by the decoder device; and parallel-to-serial converting means, connected to the only one mask register and connected to the plurality of vector operation units via the second bus, for reading parallel mask data from the mask register at the read address generated by the decoder device, for converting the parallel mask data into serial mask data, and for outputting the serial mask data to the second bus.

2. The vector processor as claimed in claim 1, wherein said serial-to-parallel converting means includes a plurality of serial-to-parallel converting circuits which simultaneously process serial mask data and simultaneously output parallel mask data to the mask register.

3. The vector processor as claimed in claim 1, wherein said parallel-to-serial converting means includes a plurality of parallel-to-serial converting circuits which simultaneously process parallel mask data read from the mask register and output serial mask data to the second bus.

4. The vector processor as claimed in claim 1, further comprising mask data operating means for receiving the parallel mask data from the mask register, for performing a mask operation on the parallel mask data, and for writing a result of the mask operation into the mask register.

5. The vector processor as claimed in claim 1, wherein the vector register, the plurality of vector operation units connected to the vector register via the first bus, the mask register, the decoder device, the serial-to-parallel converting means, and the parallel-to-serial converting means are formed on one chip.

* * * * *

UNITED STATES PATENT AND TRADEMARK OFFICE
CERTIFICATE OF CORRECTION

PATENT NO. : 5,678,058
DATED : October 14, 1997
INVENTOR(S) : Taizo Sato

It is certified that error appears in the above-identified patent and that said Letters Patent is hereby corrected as shown below:

Title page, item [54] and col. 1, line 1, the title should read as following -- VECTOR PROCESSOR INCLUDING DECODER AND MASK REGISTER TO STORE MASK DATA FOR CONTROLLING VECTOR OPERATIONS--.

Column 3, line 1, change ".," to --,--.

Signed and Sealed this

Tenth Day of March, 1998

Attest:

BRUCE LEHMAN

Attesting Officer      Commissioner of Patents and Trademarks